(12) United States Patent
Kim (10) Patent No.: US 12,422,408 B2
(45) Date of Patent: Sep. 23, 2025

(54) METHOD AND SYSTEM FOR CALIBRATING ULTRASONIC SENSOR

(71) Applicant: Samsung Display Co., LTD., Yongin-si (KR)

(72) Inventor: Kee Yong Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 189 days.

(21) Appl. No.: 18/185,259

(22) Filed: Mar. 16, 2023

(65) Prior Publication Data

US 2023/0324342 A1 Oct. 12, 2023

(30) Foreign Application Priority Data

Apr. 7, 2022 (KR) .......................... 10-2022-0043594

(51) Int. Cl.
*G01N 29/06* (2006.01)
*G01N 29/12* (2006.01)
*G01N 29/44* (2006.01)

(52) U.S. Cl.
CPC ......... *G01N 29/0654* (2013.01); *G01N 29/12* (2013.01); *G01N 29/4463* (2013.01)

(58) Field of Classification Search
CPC ............... G01N 29/0654; G01N 29/12; G01N 29/4463; G01N 29/4436; G01N 29/30; G01N 29/348; G01D 18/00; G06V 40/1306; G06V 40/1347
See application file for complete search history.

(56) References Cited

U.S. PATENT DOCUMENTS

| | | | |
|---|---|---|---|
| 10,802,643 B2* | 10/2020 | Park | G06F 3/0412 |
| 11,686,830 B2* | 6/2023 | Kim | G06V 40/1306 |
| | | | 345/177 |
| 2016/0379039 A1* | 12/2016 | Dagan | H04M 1/67 |
| | | | 382/124 |
| 2020/0218875 A1 | 7/2020 | Wen | |

(Continued)

FOREIGN PATENT DOCUMENTS

| KR | 10-1784781 B1 | 10/2017 |
|---|---|---|
| KR | 10-2018-0021728 A | 3/2018 |
| KR | 10-2020-0086202 A | 7/2020 |

(Continued)

*Primary Examiner* — Xin Y Zhong
(74) *Attorney, Agent, or Firm* — Womble Bond Dickinson (US) LLP (57) ABSTRACT

A method for calibrating an ultrasonic sensor includes: transmitting a first ultrasonic signal from the ultrasonic sensor toward a first surface of a contact device when a model is on the first surface of the contact device; generating ultrasonic images by sampling a first ultrasonic echo signal, the first ultrasonic echo signal comprising a reflected signal of the first ultrasonic signal, at a plurality of reception time points; detecting portions of the ultrasonic images, wherein detected portions of the ultrasonic images are most similar to corresponding portions of a reference image of the model compared to other portions of the ultrasonic images having same positions as the detected portions and detected at different reception time points of the plurality of reception time points than the detected portions; and storing the reception time points corresponding to the detected portions of the ultrasonic images.

20 Claims, 10 Drawing Sheets

(56) References Cited

U.S. PATENT DOCUMENTS

2021/0158011 A1\* 5/2021 Serrentino ......... G06V 40/1353

FOREIGN PATENT DOCUMENTS

| KR | 10-2020-0097718 A | 8/2020 |
|----|-------------------|--------|
| KR | 10-2384014 B1 | 4/2022 |
| WO | WO 2014/197333 A1 | 12/2014 |
| WO | WO 2017-003654 A1 | 1/2017 |
| WO | WO 2019/125283 A1 | 6/2019 |

\* cited by examiner

Global Freq * Time Local

FIG. 10

Line Freq * Time Local

FIG. 11

Local Freq * Time Local

FIG. 12

Horizontal Freq * Time Vertical

METHOD AND SYSTEM FOR CALIBRATING ULTRASONIC SENSOR

CROSS-REFERENCE TO RELATED APPLICATION

The application claims priority to and the benefit of Korean Patent Application No. 10-2022-0043594, filed Apr. 7, 2022, in the Korean Intellectual Property Office, the entire content of which is hereby incorporated by reference.

BACKGROUND

1. Field

The present disclosure relates to a method and system for calibrating an ultrasonic sensor.

2. Description of Related Art

With the development of information technology, the importance of display devices, which are a connection medium between users and information, has been emphasized. In response to this, the use of display devices such as liquid crystal display devices, organic light emitting display devices, and/or the like has been increasing.

According to consumer demand, a display device may include various sensors such as a touch sensor, a fingerprint sensor, an illuminance sensor, and/or a camera. For example, the fingerprint sensor may be attached to a rear surface of a display panel to recognize ridges and valleys of a fingerprint based on information of a carrier (for example, ultrasonic wave or light) passing through the display panel.

However, deviations may occur in a process of manufacturing a sensor and a process of attaching the sensor to the display panel, and calibration may be desired or required after attaching the sensor to the display panel.

SUMMARY

Aspects of one or more embodiments of the present disclosure are directed towards a method and system for calibrating an ultrasonic sensor in which the uniformity can be improved by directly calibrating each portion of an ultrasonic image.

Additional aspects will be set forth in part in the description which follows and, in part, will be apparent from the description, or may be learned by practice of the presented embodiments of the disclosure.

A method for calibrating an ultrasonic sensor according to one or more embodiments of the present disclosure may include: transmitting a first ultrasonic signal from the ultrasonic sensor toward a first surface of a contact device when a model is on the first surface of the contact device; generating ultrasonic images by sampling a first ultrasonic echo signal, the first ultrasonic echo signal comprising a reflected signal of the first ultrasonic signal, at a plurality of reception time points; detecting portions of the ultrasonic images, wherein detected portions of the ultrasonic images are most similar to corresponding portions of a reference image of the model when compared to other portions of the ultrasonic images having same positions as the detected portions and detected at different reception time points of the plurality of reception time points than the detected portions; and storing the reception time points corresponding to the detected portions of the ultrasonic images.

In one or more embodiments, positions of the corresponding portions of the reference image may include first coordinates on a first axis extending in a first direction and second coordinates on a second axis extending in a second direction perpendicular to the first direction (e.g., the positions defining the corresponding portion of the reference image include the first coordinates and the second coordinates).

In one or more embodiments, the positions of the detected portions of the ultrasonic images may include the first coordinates and the second coordinates, and the reception time points corresponding to the detected portions of the ultrasonic images may differ from each other at at least two of the first coordinates.

In one or more embodiments, thicknesses of the ultrasonic sensor at at least two of the first coordinates may differ from each other.

In one or more embodiments, degrees of bending of the ultrasonic sensor at at least two of the first coordinates may differ from each other.

In one or more embodiments, the positions of at least two of the detected portions may have the same first coordinates and may have different second coordinates.

A method for calibrating an ultrasonic sensor according to one or more embodiments of the present disclosure may include: transmitting ultrasonic signals of a plurality of frequencies from the ultrasonic sensor toward a first surface of a contact device when a model is on the first surface of the contact device; generating ultrasonic images by sampling ultrasonic echo signals, the ultrasonic echo signals including reflected signals of the ultrasonic signals, at a plurality of reception time points; detecting portions of the ultrasonic images, wherein detected portions of the ultrasonic images are most similar to corresponding portions of a reference image of the model compared to other portions of the ultrasonic images having same positions as the detected portions and detected at different reception time points of the plurality of reception time points than the detected portions; and storing the reception time points and the frequencies corresponding to the detected portions of the ultrasonic images.

In one or more embodiments, positions of the corresponding portions of the reference image may include first coordinates on a first axis extending in a first direction and second coordinates on a second axis extending in a second direction perpendicular to the first direction.

In one or more embodiments, positions of the detected portions of the ultrasonic images may include the first coordinates and the second coordinates, and at least two of the detected portions may have the same second coordinates, the same frequency and different reception time points.

In one or more embodiments, at least two of the detected portions may have the same first coordinates, different frequencies and independent reception time points.

In one or more embodiments, at least two of the detected portions of the ultrasonic images may have different frequencies, and different reception time points.

In one or more embodiments, at least two of the detected portions may have the same first coordinates, the same reception time point, and different frequencies.

In one or more embodiments, at least two of the detected portions may have the same second coordinates, the same frequency, and different reception time points.

A system for calibrating an ultrasonic sensor according to one or more embodiments of the present disclosure may include: a contact device having a first surface; an ultrasonic sensor configured to transmit an ultrasonic signal toward the first surface and to generate an ultrasonic image based on an ultrasonic echo signal, the ultrasonic echo signal including a reflected signal of the ultrasonic signal; and a measuring device configured to determine parameters of the ultrasonic sensor using the ultrasonic echo signal. The ultrasonic sensor is configured to transmit a first ultrasonic signal toward the first surface when a model is on the first surface, and to generate ultrasonic images by sampling a first ultrasonic echo signal, the first ultrasonic echo signal including a reflected signal of the first ultrasonic signal, at a plurality of reception time points, and the measuring device configured to detect portions of the ultrasonic images that are most similar to corresponding portions of a reference image of the model compared to other portions of the ultrasonic images having same positions as the detected portions and detected at different reception time points of the plurality of reception time points than the detected portions, and to store the reception time points of the plurality of reception time points corresponding to detected portions of the ultrasonic images as first parameters.

In one or more embodiments, positions of the corresponding portions of the reference image may include first coordinates on a first axis extending in a first direction and second coordinates on a second axis extending in a second direction perpendicular to the first direction.

In one or more embodiments, positions of the detected portions of the ultrasonic images may include the first coordinates and the second coordinates and wherein the reception time points corresponding to the detected portions may differ from each other at at least two of the first coordinates.

In one or more embodiments, the positions of at least two of the detected portions may have the same first coordinates and different second coordinates.

In one or more embodiments, the ultrasonic sensor may further be configured to transmit a second ultrasonic signal toward the first when the model is on the first surface, and to generate ultrasonic images by sampling a second ultrasonic echo signal, the second ultrasonic echo signal including a reflected signal of the second ultrasonic signal at a plurality of reception time points. A frequency of the first ultrasonic signal and a frequency of the second ultrasonic signal may be different from each other, and the measuring device may further be configured to store frequencies corresponding to the detected portions of the ultrasonic images as second parameters.

In one or more embodiments, positions of the corresponding portions of the reference image may include first coordinates on a first axis extending in a first direction and second coordinates on a second axis extending in a second direction perpendicular to the first direction, positions of the detected portions of the ultrasonic images may include the first coordinates and the second coordinates, and at least two of the detected portions may have the same second coordinates, the same frequency, and different reception time points, and at least two of the detected portions may have the same first coordinates, different frequencies, and different reception time points.

In one or more embodiments, positions of the corresponding portions of the reference image may include first coordinates on a first axis extending in a first direction and second coordinates on a second axis extending in a second direction perpendicular to the first direction, positions of the detected portions of the ultrasonic images comprises the first coordinates and the second coordinates, and at least two of the detected portions may have the same first coordinates, the same reception time point, and different frequencies, and at least two of the detected portions may have the same second coordinates, the same frequency, and different reception time points.

BRIEF DESCRIPTION OF THE DRAWINGS

The accompanying drawings, which are included to provide a further understanding of the present disclosure, and are incorporated in and constitute a part of this specification, illustrate example embodiments of the present disclosure, and, together with the description, serve to explain aspects, features, and/or principles of the present disclosure.

DETAILED DESCRIPTION

Hereinafter, various embodiments of the present disclosure will be described in more detail with reference to the accompanying drawings so that those of ordinary skill in the art may easily implement the present disclosure. The present disclosure may be embodied in various different forms and is not limited to the embodiments described herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

In order to clearly describe the present disclosure, parts that are not related to the description may not be provided, and the same or similar components are denoted by the same reference numerals throughout the specification. Therefore, the reference numerals described above may also be used in other drawings.

In addition, the size and thickness of each component shown in the drawings may be exaggerated for convenience of description, and thus the present disclosure is not necessarily limited to those shown in the drawings. In the drawings, thicknesses may be exaggerated to clearly express the layers and regions.

In addition, in the description, the expression "is the same" may mean "substantially the same". That is, it may be the same enough to convince those of ordinary skill in the art to be the same. In other expressions, "substantially" may not be provided.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
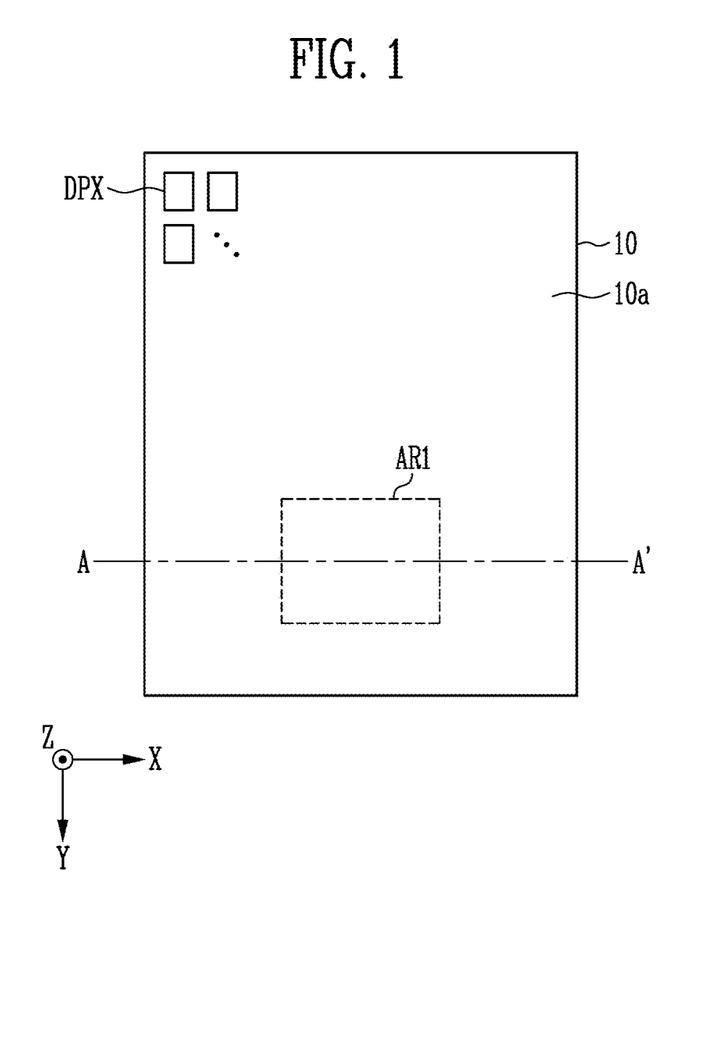
FIG. 1 is a schematic plan view for explaining a display device according to one or more embodiments of the present disclosure.
Figure 2:
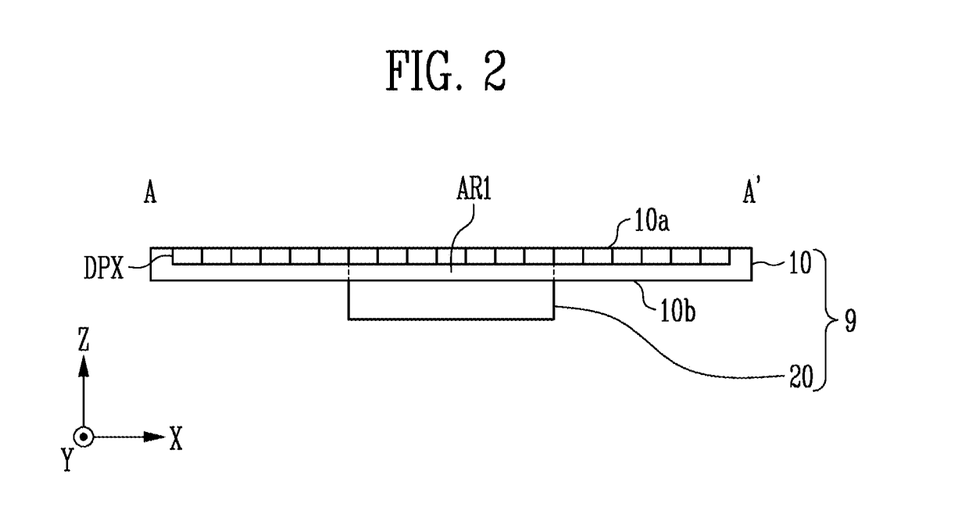
FIG. 2 is an example cross-sectional view taken along the line A-A' of FIG. 1.
Figure 3:
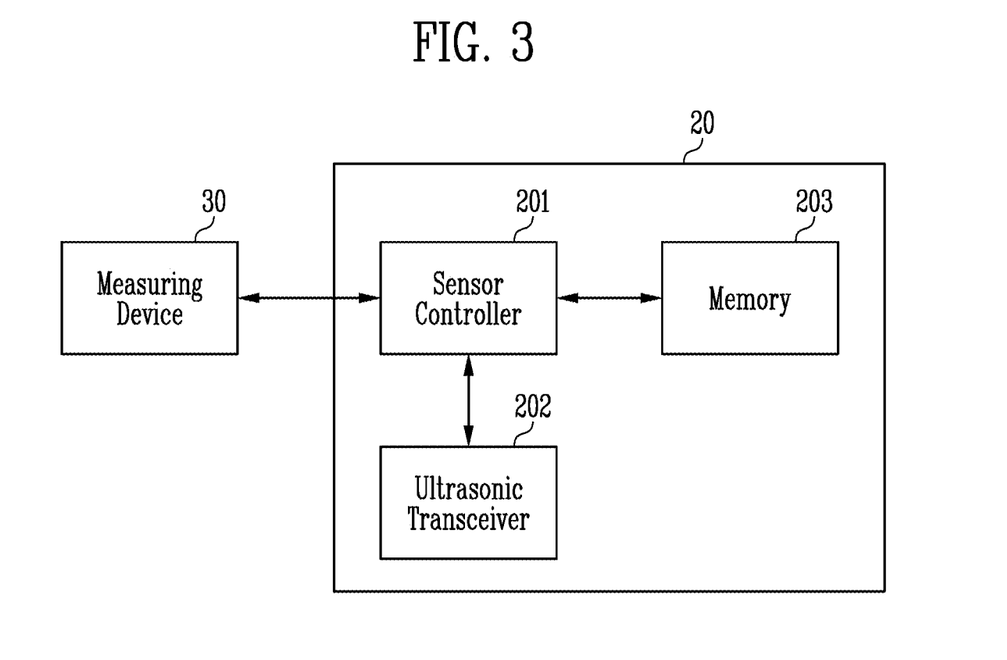
FIG. 3 is a block diagram for explaining a relationship between an ultrasonic sensor and a measuring device, according to one or more embodiments of the present disclosure.

FIG. 1 is a schematic plan view for explaining a display device according to one or more embodiments of the present disclosure. FIG. 2 is an example cross-sectional view taken along line A-A' of FIG. 1. FIG. 3 is a block diagram for explaining a relationship between an ultrasonic sensor and a measuring device, according to one or more embodiments of the present disclosure.

Referring to FIGS. 1 to 3, a display device 9 may include a display panel 10 and an ultrasonic sensor 20.

The display panel 10 may include display pixels DPX. The display pixels DPX may be arranged on a plane defined by a first direction X and a second direction Y. The display pixels DPX are not necessarily arranged in a flat shape, but may also be arranged in a curved shape. For example, a side surface of the display panel 10 may have a curved shape, and the display pixels DPX disposed on the side surface of the display panel 10 may be arranged in a curved shape. The display pixels DPX may display an image by emitting light in a third direction Z. When a user looks at a first surface 10a of the display panel 10, the user can view the displayed image. A detailed configuration of the display panel 10 may be in accordance with the related art. The first direction X, the second direction Y, and the third direction Z may be directions orthogonal to each other.

The ultrasonic sensor 20 may include a sensor controller 201, an ultrasonic transceiver 202, and a memory 203. The ultrasonic sensor 20 (or the ultrasonic transceiver 202) may be positioned to overlap a first area AR1 of the display panel 10. For example, the ultrasonic sensor 20 (or the ultrasonic transceiver 202) may be positioned to be attached to a second surface 10b of the display panel 10. The second surface 10b may be opposite to the first surface 10a. The ultrasonic sensor 20 may be a sensor utilizing ultrasonic waves as a carrier, and may be utilized as a fingerprint sensor, a health check sensor (for example, for sensing blood flow, pulse, etc. of a finger), and/or any other suitable sensor utilizing ultrasonic waves. However, for convenience of description, it is assumed that the ultrasonic sensor 20 is a fingerprint sensor hereinafter.

The ultrasonic sensor 20 may be to transmit an ultrasonic signal toward the first surface 10a, and may generate an ultrasonic image based on an ultrasonic echo signal which is a reflected signal of the ultrasonic signal. For example, when the sensor controller 201 determines parameters (for example, a frequency of the ultrasonic signal and a reception time point of the ultrasonic echo signal) of the ultrasonic signal read from the memory 203, the ultrasonic transceiver 202 may be to transmit the ultrasonic signal corresponding to the determined parameters. In one or more embodiments, when the ultrasonic transceiver 202 receives (that is, samples) the ultrasonic echo signal corresponding to the parameters, the sensor controller 201 may generate the ultrasonic image utilizing the ultrasonic echo signal. In this case, the sensor controller 201 may generate a plurality of ultrasonic images corresponding to a plurality of reception time points or frequencies of the ultrasonic echo signal. A difference between a transmission time point of the ultrasonic signal and a reception time point of the ultrasonic echo signal may be defined as a reception delay time (or range gate delay). Hereinafter, it is assumed that the transmission time point of the ultrasonic signal is constant (e.g., the same). Accordingly, different reception time points may refer to different reception delay times. Because the ultrasonic sensor 20 may be configured utilizing a related product or a related technology in the art, a detailed description thereof will not be provided.

A contact device for the ultrasonic sensor 20 (e.g., a device to be contacted to use the ultrasonic sensor 20) may not necessarily be limited to the display panel 10. For example, the contact device may be a non-display device such as a cover for the ultrasonic sensor 20. For example, when there is no air gap between the first surface 10a and the second surface 10b, any contact device for the ultrasonic sensor 20 may be applied to embodiments of the present disclosure. When there is an air gap between the first surface 10a and the second surface 10b, it may be difficult for the ultrasonic sensor 20 to exhibit effective performance because the ultrasonic signal does not pass well. Hereinafter, the reference number "10" will refer to a contact device 10 instead of the display 10.

A measuring device 30 may be configured as a general-purpose computer or a measurement-only computer. The measuring device 30 may be to transmit/receive data to/from the sensor controller 201. For example, the measuring device 30 may determine parameters of the ultrasonic sensor 20 utilizing the ultrasonic echo signal. The parameters may include a first parameter (for example, the reception time point of the ultrasonic echo signal) and a second parameter (for example, the frequency of the ultrasonic signal). The parameters determined by the measuring device 30 may be stored in the memory 203 of the ultrasonic sensor 20 and utilized in the end user environment.

Figure 4:
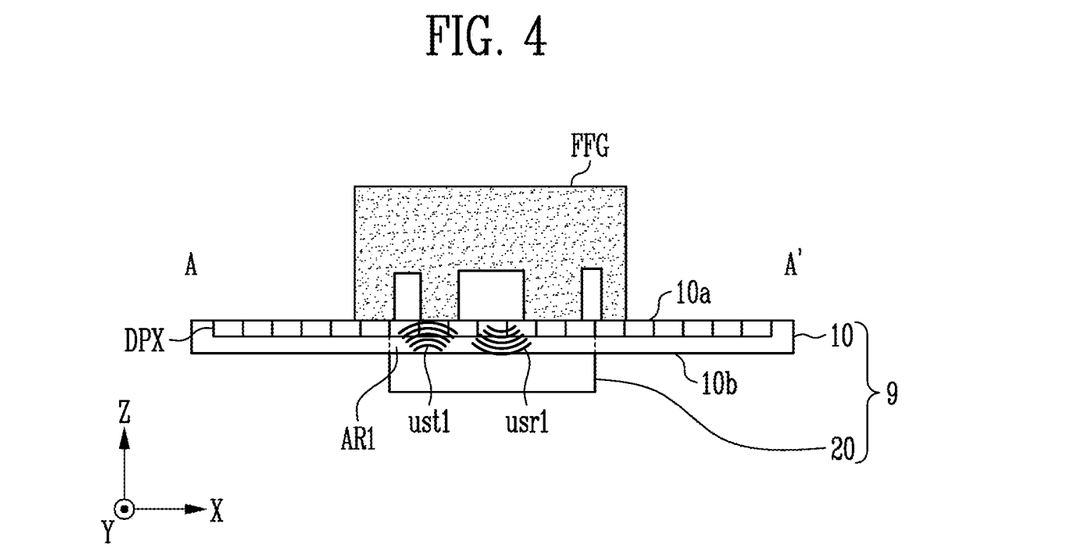
FIG. 4 is an example cross-sectional view taken along the line A-A' for explaining a process of calibrating the ultrasonic sensor.

FIG. 4 is an example cross-sectional view taken along the line A-A' for explaining a process of calibrating the ultrasonic sensor, according to one or more embodiments of the present disclosure.

Referring to FIG. 4, in a state where a model FFG is positioned on the first surface 10a of the contact device 10, the ultrasonic sensor 20 may be to transmit a first ultrasonic signal ust1 of a specific frequency toward the first surface 10a.

Here, the model FFG may be similar to or the same as a sensing target of the ultrasonic sensor 20. For example, when the ultrasonic sensor 20 is a fingerprint sensor, the sensing target may be a fingerprint. In this case, a surface of the model FFG in contact with the first surface 10a may have ridges and valleys like or similar to a human fingerprint. For example, the model FFG may be made of a material such as rubber or polydimethylsiloxane (PDMS).

Next, the ultrasonic sensor 20 may generate an ultrasonic image by sampling a first ultrasonic echo signal usr1 which is a reflected signal of the first ultrasonic signal ust1 at a specific reception time point.

The generated ultrasonic images may vary according to a combination of the frequency of the first ultrasonic signal ust1 and the reception time point of the first ultrasonic echo signal usr1. In this case, the measuring device 30 may select an ultrasonic image having the highest similarity to a reference image from among the generated ultrasonic images. For example, the reference image may be an image in which the ridges and valleys of the model FFG are clearly distinguished, and may be prepared in advance. The reference image and the ultrasonic images may be objects defined by first coordinates on a first axis extending in the first direction X and second coordinates on a second axis extending in the second direction Y perpendicular to the first direction X. The measuring device 30 may store a combination of the frequency and the reception time point corresponding to the selected ultrasonic image in the memory 203 of the ultrasonic sensor 20 as parameters.

Figure 5:
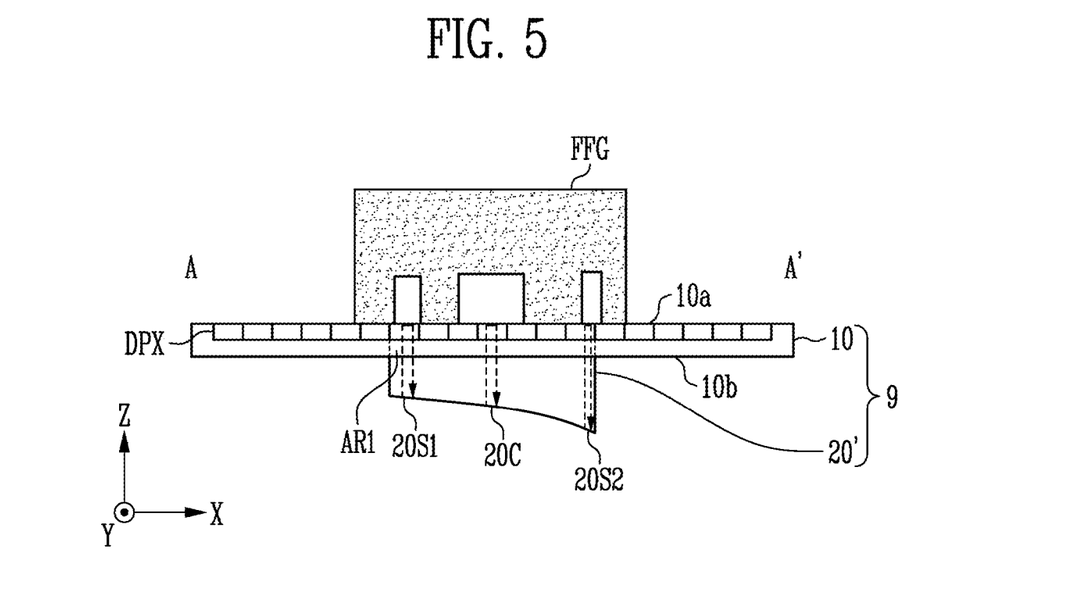
FIG. 5 is an example cross-sectional view taken along the line A-A' for explaining a deviation of the ultrasonic sensor, according to one or more embodiments of the present disclosure.

FIG. 5 is an example cross-sectional view taken along the line A-A' for explaining a deviation of the ultrasonic sensor, according to one or more embodiments of the present disclosure.

The calibration process described in FIG. 4 assumes that the ultrasonic sensor 20 is ideal, e.g., has no deviations. In this case, even when the stored parameters are applied to an entire area of the ultrasonic image, there may be no problem.

However, in reality, an ultrasonic sensor 20' may have deviations (distribution of characteristics of transducers, deviation of thickness by location, etc.) occurring in a manufacturing process, and deviations (degree of inclination and bending) may occur in a process of attaching the ultrasonic sensor 20' to the display panel 10.

For example, based on a central position 20C of the ultrasonic sensor 20', a first position 20S1 may be thinner and a second position 20S2 may be thicker. For example, thicknesses of the ultrasonic sensors 20' corresponding to the first coordinates may be different from each other. In one or more embodiments, the thickness of the ultrasonic sensor 20' may be constant, but the second position 20S2 may be bent in a direction opposite to the third direction Z. For example, the degrees of bending of the ultrasonic sensor 20' corresponding to the first coordinates may be different from each other.

In this case, based on the reception delay time of the central position 20C of the ultrasonic sensor 20', the reception delay time of the first position 20S1 may be shorter and the reception delay time of the second position 20S2 may be longer.

Figure 6:
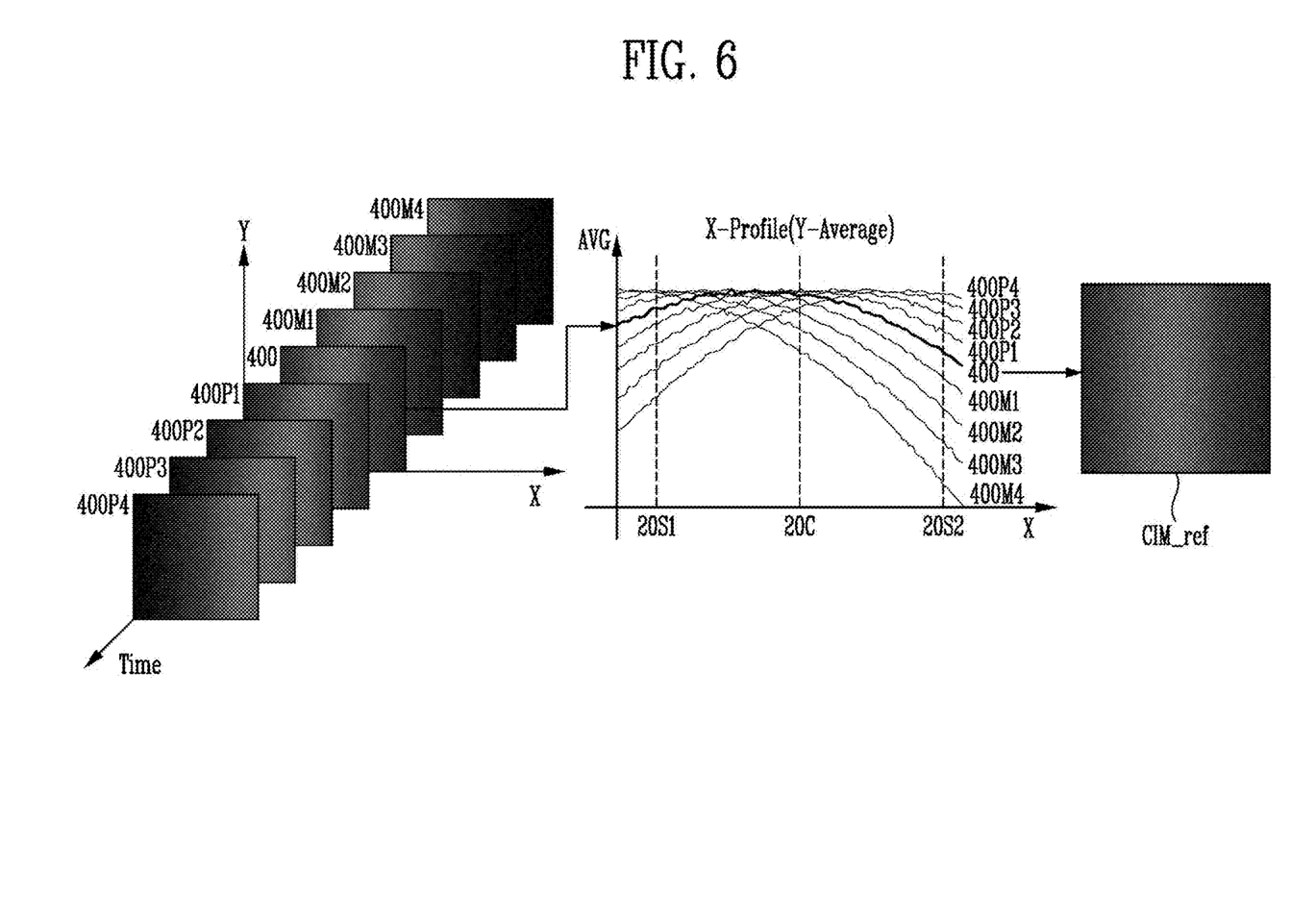
FIG. 6 is a diagram for explaining a calibration method, according to one or more embodiments of the present disclosure.

FIG. 6 is a diagram for explaining a calibration method according to one or more embodiments of the present disclosure.

Referring to FIG. 6, ultrasonic images 400M4, 400M3, 400M2, 400M1, 400, 400P1, 400P2, 400P3, and 400P4 generated by sampling the first ultrasonic echo signal usr1 based on the first ultrasonic signal ust1 of a specific frequency at a plurality of reception time points (e.g., a plurality of points in time at which the first ultrasonic echo signal usr1 is received are sampled) are shown as an example. For example, the ultrasonic image 400P4 may be an image to which the longest reception delay time is applied among the ultrasonic images 400M4 to 400P4. The ultrasonic image 400M4 may be an image to which the shortest reception delay time is applied among the ultrasonic images 400M4 to 400P4.

In the embodiment(s) of FIG. 6, the measuring device 30 may determine whether the ultrasonic image is similar to the reference image at the central position 20C. In general, a portion having a high similarity to the reference image among portions of the ultrasonic image may be clear due to high luminance. Also, a portion having a low similarity to the reference image among portions of the ultrasonic image may be difficult to identify due to low luminance. Accordingly, the measuring device 30 may determine the similarity based on the luminance (for example, when the luminance is high, the similarity is high), or may determine the similarity through a separate similarity algorithm.

For example, the measuring device 30 may determine the reception time point utilized to generate an ultrasonic image 400 having high luminance at the central position 20C as a first parameter of the ultrasonic sensor 20. Accordingly, when the calibrated ultrasonic sensor 20' senses the model FFG, an ultrasonic image CIM_ref identical to the ultrasonic image 400 can be generated. In this case, dark portions may occur in the ultrasonic image at (e.g., defined by) positions 20S1 and 20S2 other than the central position 20C, and it may be difficult to recognize a fingerprint.

Figure 7:
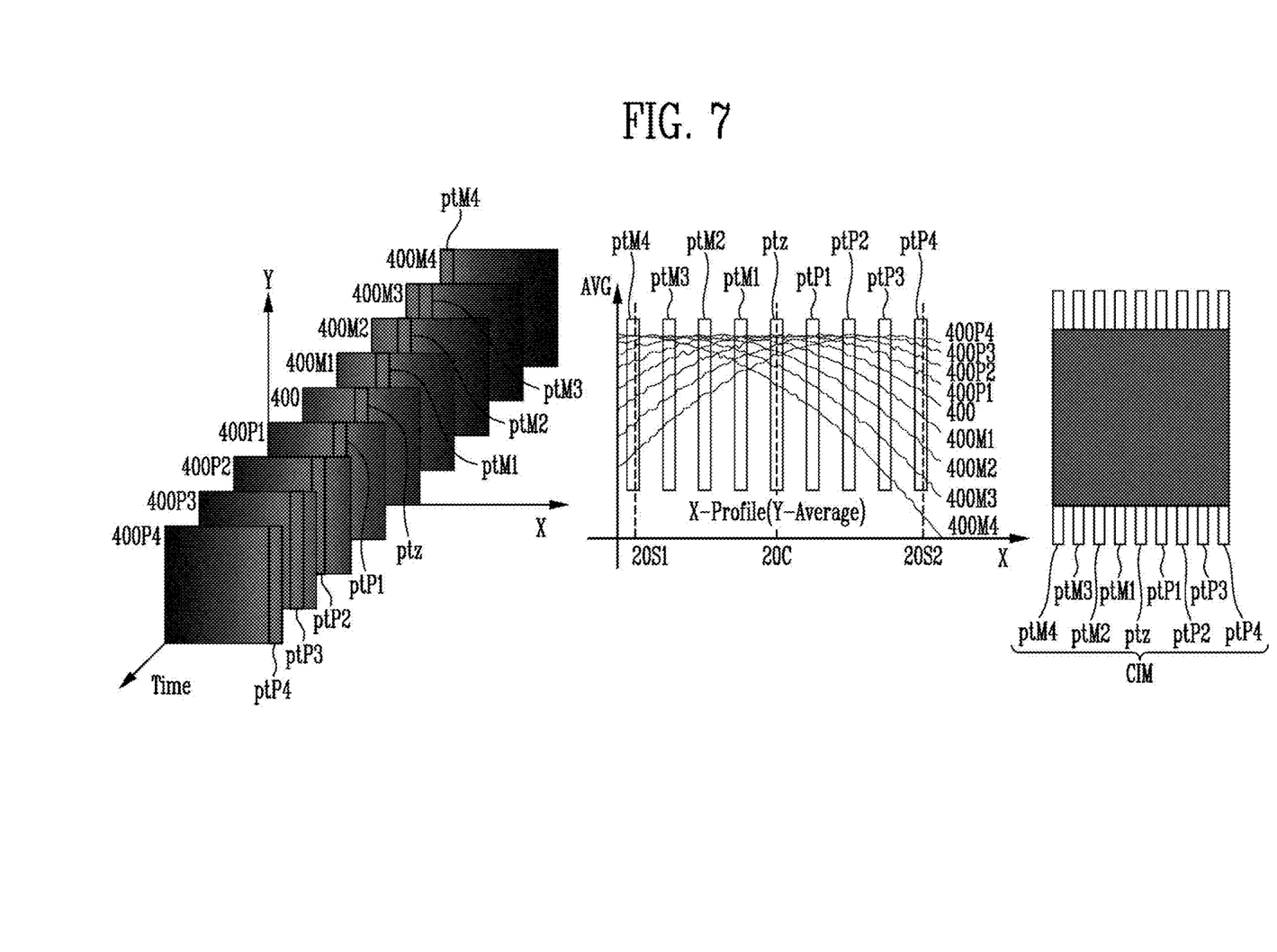
FIGS. 7 and 8 are diagrams for explaining a calibration method, according to one or more embodiments of the present disclosure.
Figure 8:
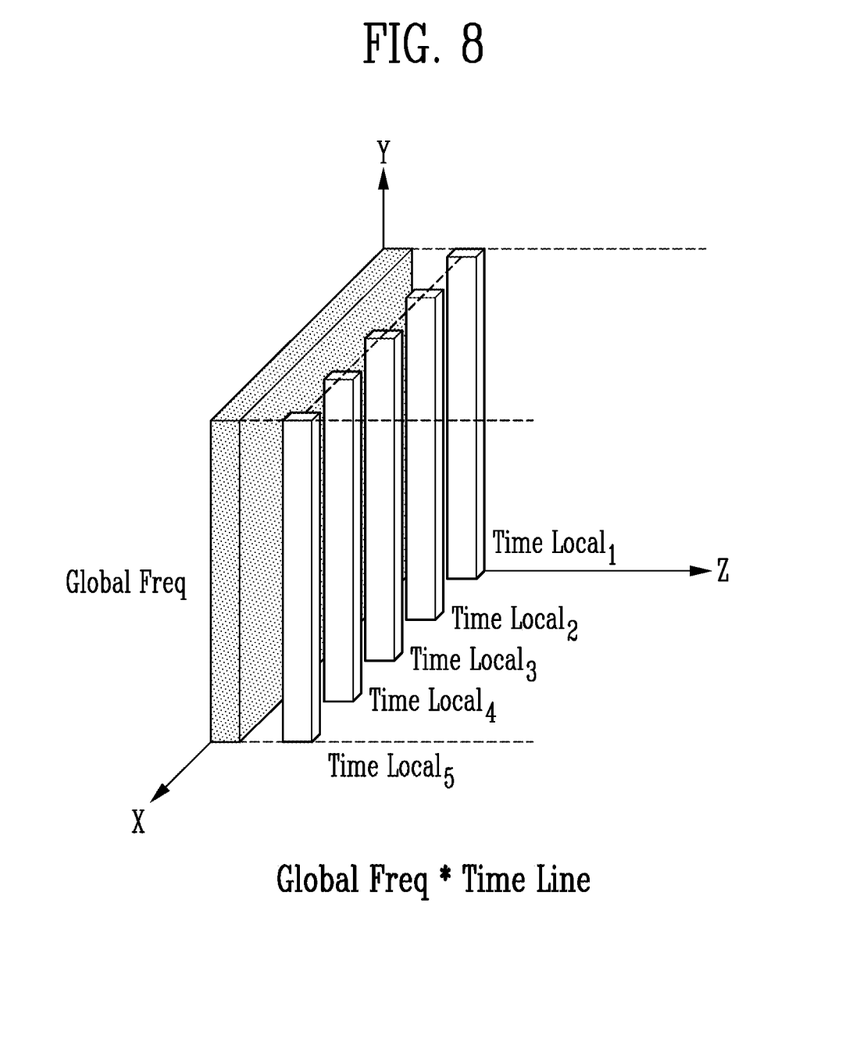

FIGS. 7 and 8 are diagrams for explaining a calibration method according to one or more embodiments of the present disclosure.

Ultrasonic images 400M4 to 400P4 of FIG. 7 may be the same as the ultrasonic images 400M4 to 400P4 of FIG. 6. For example, the ultrasonic images 400M4 to 400P4 may be ultrasonic images generated by sampling the first ultrasonic echo signal usr1 based on the first ultrasonic signal ust1 of a specific frequency at a plurality of reception time points.

In the present embodiment, the measuring device 30 may detect portions ptM4, ptM3, ptM2, ptM1, ptz, ptP1, ptP2, ptP3, and ptP4 of the ultrasonic images 400M4 to 400P4 most similar to each of portions of the reference image, and store the reception time points corresponding to the detected portions ptM4 to ptP4 of the ultrasonic images 400M4 to 400P4 in the memory 203 as first parameters.

For example, the measuring device 30 may determine the reception time point utilized to generate the ultrasonic image 400 including a portion ptz having high luminance at the central position 20C as a first parameter for the central position 20C. In one or more embodiments, the measuring device 30 may determine the reception time point utilized to generate the ultrasonic image 400M4 including a portion ptM4 having high luminance at the first position 20S1 as a first parameter for the first position 20S1. In one or more embodiments, the measuring device 30 may determine the reception time point utilized to generate the ultrasonic image 400P4 including a portion ptP4 having high luminance at the second position 20S2 as a first parameter for the second position 20S2. Similarly, the measuring device 30 may determine the reception time points utilized to generate the ultrasonic images 400M3, 400M2, 400M1, 400P1, 400P2, and 400P3 including portions ptM3, ptM2, ptM1, ptP1, ptP2, and ptP3 having high luminance at different positions as first parameters for each position.

Accordingly, when the calibrated ultrasonic sensor 20' senses the model FFG, portions ptM4 to ptP4 of the ultrasonic images 400M4 to 400P4 may be generated. The ultrasonic sensor 20' may generate an ultrasonic image CIM by combining the portions ptM4 to ptP4 to correspond to each position. In this case, the portions ptM4 to ptP4 may not overlap each other. For example, the first coordinates of the portions ptM4 to ptP4 may not overlap each other. For example, the ultrasonic sensor 20' may complete the ultrasonic image CIM by interpolating adjacent boundaries of the portions ptM4 to ptP4 in empty areas where the portions ptM4 to ptP4 do not exist.

According to the present embodiment(s), a clear (or high-brightness) ultrasonic image CIM can be generated not only at the central position 20C but also at other positions 20S1 and 20S2, and a fingerprint can be easily recognized in all portions of the ultrasonic image CIM.

The first parameter (reception time points) and the second parameter (frequency) stored in the memory 203 based on the embodiment(s) of FIG. 7 may be expressed as the graph of FIG. 8. Referring to FIG. 8, among the detected portions of the ultrasonic image, portions having the same first coordinates may have the same reception time point. Among the portions of the ultrasonic image, portions having different first coordinates may have different reception time points. In this case, the same frequency may be applied to the portions of the ultrasonic image.

FIGS. 9 to 12 are diagrams for explaining a calibration method according to one or more embodiments of the present disclosure.

In the embodiment(s) of FIGS. 7 and 8, the detected portions ptM4 to ptP4 of the ultrasonic image may have a line form extending in the second direction Y. However, in embodiments of FIGS. 9 to 12, detected portions of the ultrasonic image may have a localized form. For example, among the detected portions of the ultrasonic images, portions having the same first coordinates (e.g., the same coordinates in the first direction X) may have different second coordinates (e.g., different coordinates in the second direction Y).

Figure 9:
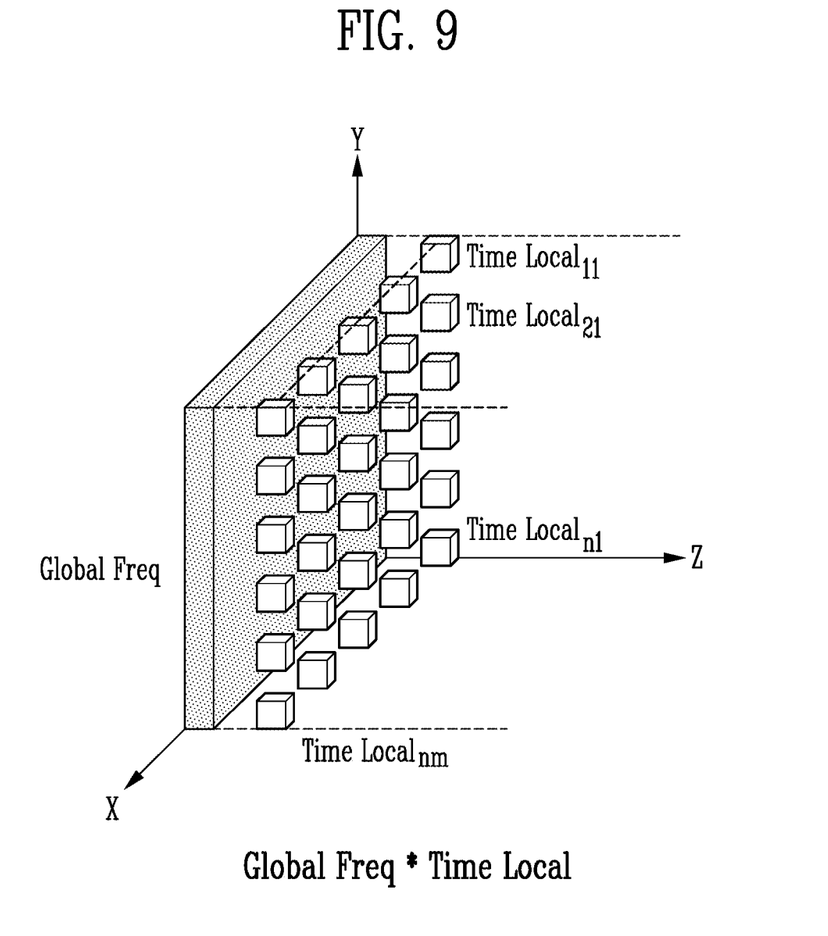
FIGS. 9-12 are diagrams for explaining a calibration method, according to one or more embodiments of the present disclosure.

Referring to FIG. 9, the reception time points of the detected portions of the ultrasonic images may be independent from each other. In this case, the same frequency may be applied to the detected portions of the ultrasonic images. In the present embodiment, the memory 203 may store a plurality of first parameters (reception time points) and one second parameter (frequency).

Figure 10:
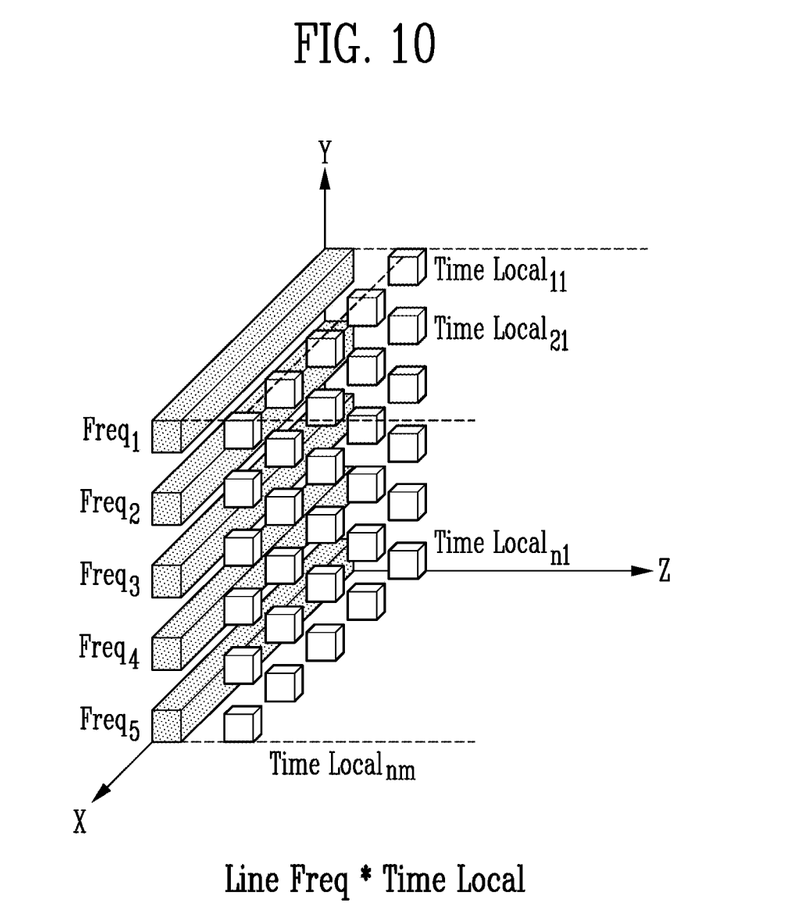

Referring to FIG. 10, among the detected portions of the ultrasonic images, portions having the same second coordinates may have the same frequency and independent reception time points. Also, among the detected portions of the ultrasonic images, portions having the same first coordinates may have different frequencies and independent reception time points. In the present embodiment(s), the memory 203 may store a plurality of first parameters (reception time points) and a plurality of second parameters (frequencies).

Figure 11:
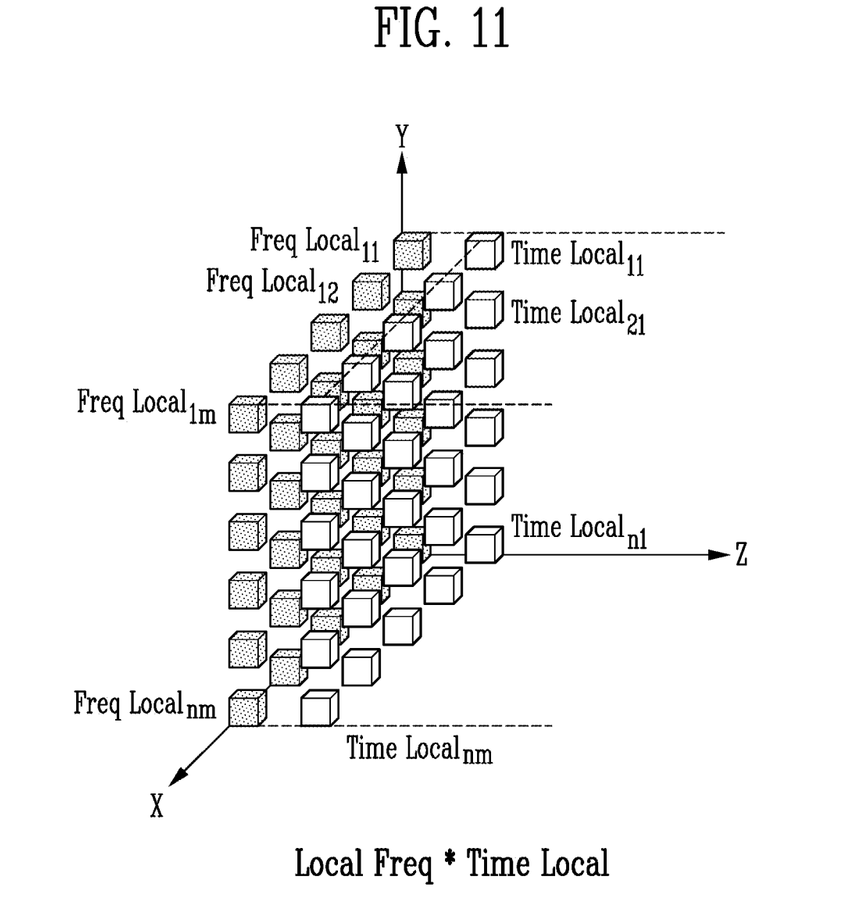

Referring to FIG. 11, the detected portions of the ultrasonic images may have different frequencies and independent reception time points. In the present embodiment(s), the memory 203 may store a plurality of first parameters (reception time points) and a plurality of second parameters (frequencies).

Figure 12:
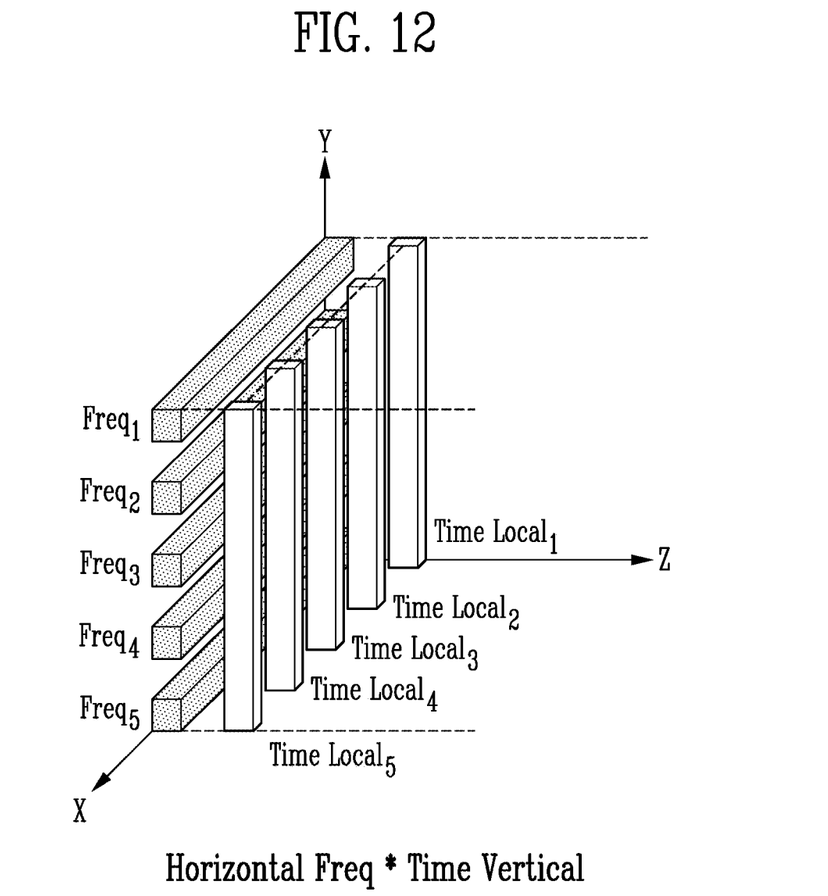

Referring to FIG. 12, among the detected portions of the ultrasonic images, portions having the same first coordinates may have the same reception time point, but may have different frequencies. Also, among the detected portions of the ultrasonic images, portions having the same second coordinates may have the same frequency, but may have different reception time points. In the present embodiment(s), the memory 203 may store a plurality of first parameters (reception time points) and a plurality of second parameters (frequencies).

For example, in the embodiments of FIGS. 10 to 12, the ultrasonic sensor 20' may further transmits a second ultrasonic signal toward the first surface 10a in a state where the model FFG is positioned on the first surface 10a, and generate the ultrasonic images by sampling a second ultrasonic echo signal reflected by the second ultrasonic signal and the first ultrasonic echo signal usr1 at a plurality of reception time points. In this case, the frequency of the first ultrasonic signal ust1 and the frequency of the second ultrasonic signal may be different from each other. In this case, the measuring device 30 may further store frequencies corresponding to the detected portions of the ultrasonic images as the second parameters in the memory 203.

Aspects of the method and system for calibrating an ultrasonic sensor according to one or more embodiments of the present disclosure can improve the uniformity by directly calibrating each portion of an ultrasonic image.

The [digital circuit] may be implemented with logic gates as illustrated [in FIG. 8], or with any other embodiment of a [processing unit or processor]. The term ["processing unit" or "processor"] is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

The sensor and/or any other relevant devices or components according to embodiments of the present invention described herein may be implemented utilizing any suitable hardware, firmware (e.g. an application-specific integrated circuit), software, or a combination of software, firmware, and hardware. For example, the various components of the sensor may be formed on one integrated circuit (IC) chip or on separate IC chips. Further, the various components of the sensor may be implemented on a flexible printed circuit film, a tape carrier package (TCP), a printed circuit board (PCB), or formed on one substrate. Further, the various components of the sensor may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the present disclosure.

The drawings referred to heretofore and the detailed description of the present disclosure described above are merely illustrative of the present disclosure. It is to be understood that the present disclosure has been disclosed for illustrative purposes only and is not intended to limit the meaning or scope of the present disclosure as set forth in the claims. Therefore, those skilled in the art will appreciate that various modifications and equivalent embodiments are possible without departing from the scope of the present disclosure. Accordingly, the true technical protection scope of the present disclosure should be determined by the technical idea of the appended claims and their equivalents.

What is claimed is:

1. A method for calibrating an ultrasonic sensor, the method comprising:
    transmitting a first ultrasonic signal from the ultrasonic sensor toward a first surface of a contact device when a model is on the first surface of the contact device;
    generating ultrasonic images by sampling a first ultrasonic echo signal, the first ultrasonic echo signal comprising a reflected signal of the first ultrasonic signal, at a plurality of reception time points;
    detecting portions of the ultrasonic images, wherein detected portions of the ultrasonic images are most similar to corresponding portions of a reference image of the model when compared to other portions of the ultrasonic images having same positions as the detected portions and detected at different reception time points of the plurality of reception time points than the detected portions; and
    storing the reception time points of the plurality of reception time points corresponding to the detected portions of the ultrasonic images.

2. The method of claim 1, wherein positions of the corresponding portions of the reference image comprise first coordinates on a first axis extending in a first direction, and second coordinates on a second axis extending in a second direction perpendicular to the first direction.

3. The method of claim 2, wherein the positions of the detected portions of the ultrasonic images comprise the first coordinates and the second coordinates, and the reception time points corresponding to the detected portions of the ultrasonic images differ from each other at at least two of the first coordinates.

4. The method of claim 3, wherein thicknesses of the ultrasonic sensor at at least two of the first coordinates differ from each other.

5. The method of claim 3, wherein degrees of bending of the ultrasonic sensor at at least two of the first coordinates differ from each other.

6. The method of claim 2, wherein the positions of at least two of the detected portions have the same first coordinates and different second coordinates.

7. A method for calibrating an ultrasonic sensor, the method comprising:
    transmitting ultrasonic signals comprising a plurality of frequencies from the ultrasonic sensor toward a first surface of a contact device when a model is on the first surface of the contact device;
    generating ultrasonic images by sampling ultrasonic echo signals, the ultrasonic echo signals comprising reflected signals of the ultrasonic signals, at a plurality of reception time points;
    detecting portions of the ultrasonic images, wherein detected portions of the ultrasonic images are most similar to corresponding portions of a reference image of the model compared to other portions of the ultrasonic images having same positions as the detected portions and detected at different reception time points of the plurality of reception time points than the detected portions; and
    storing the reception time points of the plurality of reception time points and the frequencies of the plurality of frequencies corresponding to the detected portions of the ultrasonic images.

8. The method of claim 7, wherein positions of the corresponding portions of the reference image comprise first coordinates on a first axis extending in a first direction and second coordinates on a second axis extending in a second direction perpendicular to the first direction.

9. The method of claim 8, wherein positions of the detected portions of the ultrasonic images comprise the first coordinates and the second coordinates, and at least two of the detected portions have the same second coordinates, the same frequency and different reception time points.

10. The method of claim 9, wherein at least two of the detected portions have the same first coordinates, have different frequencies, and different reception time points.

11. The method of claim 8, wherein at least two of the detected portions of the ultrasonic images have different frequencies and different reception time points.

12. The method of claim 8, wherein positions of the detected portions of the ultrasonic images comprise the first coordinates and the second coordinates, and at least two of the detected portions have the same first coordinates, the same reception time point, and different frequencies.

13. The method of claim 12, wherein at least two of the detected portions have the same second coordinates, the same frequency, and different reception time points.

14. A system for calibrating an ultrasonic sensor, the system comprising:
    a contact device having a first surface;
    an ultrasonic sensor configured to transmit an ultrasonic signal toward the first surface and to generate an ultrasonic image based on an ultrasonic echo signal, the ultrasonic echo signal comprising a reflected signal of the ultrasonic signal; and
    a measuring device configured to determine parameters of the ultrasonic sensor using the ultrasonic echo signal,
    wherein the ultrasonic sensor is configured to transmit a first ultrasonic signal toward the first surface when a model is on the first surface, and to generate ultrasonic images by sampling a first ultrasonic echo signal, the first ultrasonic echo signal comprising a reflected signal of the first ultrasonic signal, at a plurality of reception time points, and wherein the measuring device is configured to detect portions of the ultrasonic images that are most similar to corresponding portions of a reference image of the model compared to other portions of the ultrasonic images having same positions as the detected portions and detected at different reception time points of the plurality of reception time points than the detected portions, and to store reception time points of the plurality of reception time points corresponding to detected portions of the ultrasonic images as first parameters.

15. The system of claim 14, wherein positions of the corresponding portions of the reference image comprise first coordinates on a first axis extending in a first direction and second coordinates on a second axis extending in a second direction perpendicular to the first direction.

16. The system of claim 15, wherein positions of the detected portions of the ultrasonic images comprise the first coordinates and the second coordinates and wherein the reception time points corresponding to the detected portions differ from each other at at least two of the first coordinates.

17. The system of claim 15, wherein the positions of at least two of the detected portions have the same first coordinates and different second coordinates.

18. The system of claim 14, wherein the ultrasonic sensor is further configured to transmit a second ultrasonic signal toward the first surface when the model is on the first surface, and to generate ultrasonic images by sampling a second ultrasonic echo signal, the second ultrasonic echo signal comprising a second reflected signal of the second ultrasonic signal, at a plurality of reception time points, wherein a frequency of the first ultrasonic signal and a frequency of the second ultrasonic signal are different from each other, and wherein the measuring device is further configured to store frequencies corresponding to the detected portions of the ultrasonic images as second parameters.

19. The system of claim 18, wherein positions of the corresponding portions of the reference image comprise first coordinates on a first axis extending in a first direction and second coordinates on a second axis extending in a second direction perpendicular to the first direction, wherein positions of the detected portions of the ultrasonic images comprises the first coordinates and the second coordinates, and at least two of the detected portions have the same second coordinates, the same frequency and different reception time points, and wherein at least two of the detected portions have the same first coordinates, different frequencies and different reception time points.

20. The system of claim 18, wherein positions of the corresponding portions of the reference image comprise first coordinates on a first axis extending in a first direction and second coordinates on a second axis extending in a second direction perpendicular to the first direction, wherein positions of the detected portions of the ultrasonic images comprises the first coordinates and the second coordinates, and at least two of the detected portions have the same first coordinates, the same reception time point, and different frequencies, and wherein at least two of the detected portions have the same second coordinates, the same frequency, and different reception time points.

* * * * *